United States Patent
Arnason

(10) Patent No.: US 10,357,805 B2
(45) Date of Patent: Jul. 23, 2019

(54) APPARATUS FOR IMAGING, SORTING AND BATCHING WHOLE FISH

(71) Applicant: SKAGINN HF., Akranes (IS)

(72) Inventor: Ingolfur Arnason, Akranes (IS)

(73) Assignee: SKAGINN HF, Akranes (IS)

( * ) Notice: Subject to any disclaimer, the term of this patent is extended or adjusted under 35 U.S.C. 154(b) by 14 days.

(21) Appl. No.: 15/553,880

(22) PCT Filed: Feb. 26, 2016

(86) PCT No.: PCT/IS2016/050005
§ 371 (c)(1),
(2) Date: Aug. 25, 2017

(87) PCT Pub. No.: WO2016/135758
PCT Pub. Date: Sep. 1, 2016

(65) Prior Publication Data
US 2018/0036773 A1  Feb. 8, 2018

(30) Foreign Application Priority Data

Feb. 26, 2015 (IS) .......................................... 050103

(51) Int. Cl.
*G06K 9/00* (2006.01)
*B07C 5/342* (2006.01)
*A22C 25/08* (2006.01)
*G06T 7/00* (2017.01)

(52) U.S. Cl.
CPC .............. *B07C 5/342* (2013.01); *A22C 25/08* (2013.01); *B07C 2501/0081* (2013.01); *G06T 7/0004* (2013.01)

(58) Field of Classification Search
CPC ......... A22C 25/08; A22C 25/04; A22C 25/00; A22C 25/12; B07C 5/342; B07C 2501/0081; B07C 5/12; B07C 5/16; B07C 5/34; B07C 5/3422; B65G 47/46; Y10S 209/934
See application file for complete search history.

(56) References Cited

U.S. PATENT DOCUMENTS

| | | | |
|---|---|---|---|
| 2,883,816 A * | 4/1959 | Eberhard | B65B 39/12 141/253 |
| 4,601,083 A | 7/1986 | Shoji et al. | |
| 4,934,537 A | 6/1990 | DeBourke | |
| 5,142,160 A | 8/1992 | Storbeck | |

(Continued)

FOREIGN PATENT DOCUMENTS

| | | |
|---|---|---|
| EP | 0331390 A2 | 9/1989 |
| JP | H 08140562 A | 6/1996 |

(Continued)

*Primary Examiner* — Li Liu
(74) *Attorney, Agent, or Firm* — Muncy, Geissler, Olds & Lowe, P.C.

(57) ABSTRACT

The present invention relates to a method and a device for batching fish into cooling devices. The method and the device can be used for receiving fish after bleeding and gutting freshly caught fish on board a fishing vessel and batching the fish into cooling devices. The batching and cooling apparatus and method may be used to increase the value of the fish by shortening the time from the fish is caught until the fish is chilled for storing.

18 Claims, 3 Drawing Sheets

(56) References Cited

U.S. PATENT DOCUMENTS

| | | | |
|---|---|---|---|
| 6,512,849 B1 * | 1/2003 | Yair | B07C 3/14 |
| | | | 382/202 |
| 2005/0009463 A1 | 1/2005 | Grosseholz et al. | |
| 2005/0189274 A1 * | 9/2005 | Nielsen | B07C 5/16 |
| | | | 209/645 |
| 2005/0226489 A1 | 10/2005 | Beach et al. | |
| 2006/0052042 A1 * | 3/2006 | Rasmussen | A22C 25/00 |
| | | | 452/161 |
| 2008/0185319 A1 * | 8/2008 | Winkelmolen | B07C 5/16 |
| | | | 209/597 |
| 2009/0026119 A1 * | 1/2009 | Helgi | B07C 5/16 |
| | | | 209/596 |
| 2009/0057098 A1 * | 3/2009 | Helgi | A22C 25/08 |
| | | | 198/351 |
| 2011/0054674 A1 * | 3/2011 | Thorsson | A22C 17/0093 |
| | | | 700/230 |
| 2011/0207388 A1 * | 8/2011 | Hansen | A22C 25/08 |
| | | | 452/121 |
| 2012/0116572 A1 * | 5/2012 | Corak | B07C 5/36 |
| | | | 700/223 |
| 2017/0112152 A1 * | 4/2017 | Arnason | A22C 25/04 |
| 2017/0186133 A1 * | 6/2017 | Kunze | G06T 3/4015 |

FOREIGN PATENT DOCUMENTS

| | | |
|---|---|---|
| NL | 1038400 C | 5/2012 |
| WO | WO 94/09920 A1 | 5/1994 |
| WO | WO-2004066739 A1 * | 8/2004 ............ A22C 25/06 |
| WO | WO 2010/142413 A1 | 12/2010 |
| WO | WO 2014/174535 A1 | 10/2014 |

* cited by examiner

APPARATUS FOR IMAGING, SORTING AND BATCHING WHOLE FISH

FIELD OF THE INVENTION

The invention relates to an apparatus and method for high-throughput imaging and automating sorting and batching of whole fish, such as on board a large fishing vessel. Such apparatus and method may, for instance, be used for freshly caught fish just after, pre-processing (bleeding and gutting) for batching the fish into cooling devices. The apparatus and method may be used to increase the value of the fish by shortening the pre-processing time from catch until the fish is chilled for storing.

BACKGROUND

A continuous development of food processing, such as processing of fish products is always on demand with the focus on for instance to increase utilization and value of products as well as meeting demands for quality after processing. When handling a large quantity of fresh food products, speed is of major importance.

Modern large trawlers haul a large amount of fish at a time and it is critical that the freshly caught fish gets quickly processed and/or stored under optimal conditions for further processing at a later time, such as in land.

In many cases the final processing (skinning, filleting, etc.) is done on land, which requires storing the fish at sea and during transport to the factory. In this case the time period from when a caught fish ends up on the deck of fishing ship and to the time the fish starts cooling process needs to be as short as possible as all handling and transport has effect on the quality of the fish.

WO 2014/174535 provides an improved method where whole fish is brought to an under-cooled state by super-chilling before processing. Freshly caught fish is bled and gutted at a workstation and then each fish is individually transported to a screw blade tank filled with sea water to facilitate the bleeding of the fish and to prevent the meet to be coloured by the blood. During transport to the bleeding tank the fish passes image means to determine the size of the fish. In this manner the fish can be directed into three different lanes for rinsing and subsequently cooling to bring the fish to an undercooled state by a stepwise cooling process.

In order to efficiently batch whole fish prior to cooling it for storage until it is processed in factories on land, a large amount of fish needs to be handled in a short time to preserve freshness and quality of the fish. One of the drawbacks of batching fish before it is cooled for storing is the time and manhandling of the fish which can cause damage to the fish, delays cooling and thus reduces its value.

DESCRIPTION OF THE INVENTION

It is an object of the present invention to overcome and/or ameliorate the aforementioned drawbacks of the prior art and to provide an improved and/or alternative and/or additional method or device for imaging and increasing quality of fish during fishing.

It is an object of the present invention to provide a device in order to facilitate high-throughput imaging of individual fish and to determine one or more characteristics of the fish to determine the condition of newly caught fish.

Moreover, it is a preferred object of the present invention to provide a fast method and device, preferably designed as a feeding conveyor device, an image device and diverting means to transport fish after slaughtering and/or gutting and/or bleeding to an image device to determine at least one characteristic of the fish and to batch the fish into cooling devices based on the characteristic.

Another preferred object of the present invention is to provide a device having a design where a fish is transported as a single item after slaughtering and/or gutting and/or bleeding to a cooling device, where the a receiving portion of a device for facilitation bleeding and/or cooling is selected after image analysis and the item is diverted to the cooling device by diverting means, where speed of transfer and analysis of characteristics for batching is high. It is also a preferred object of the present invention to provide a device with an improved operability and/or an increased ease of use during operation of the device.

The object(s) underlying the present invention is (are) particularly solved by the features defined in the independent claims. The dependent claims relate to preferred embodiments of the present invention. Further additional and/or alternative aspects are discussed below.

Therefore, a preferred primary object of the present invention is solved by an apparatus for imaging and sorting fish, in particular for automatically sorting with high-throughput freshly caught fish on board a fishing vessel. The apparatus comprises imaging means configured to determine at least one characteristics of the fish, a feeding conveyor, said feeding conveyor comprising diverting means for diverting fish off the feeding conveyor and computing means configured to determine the destination of each the fish based on the determined characteristics of said fish. Preferably the imaging means comprise a line scanner that is configured to collect sequential images of each fish as the fish is conveyed on said feeding conveyor past the line scanner.

Thus, at least one of the preferred objects of the present invention is solved by an apparatus for batching fish into a cooling device. The apparatus comprises imaging means for determining at least one characteristics of the fish, a feeding conveyor further comprising diverting means for diverting the fish off the feeding conveyor and a device to facilitate bleeding of the fish and or one or more cooling tanks with a spiral shaped blade mounted on a rotation axis to convey the objects along the length of the tank, where the spiral shaped blade forms transport spaces between two adjacent blades of the spiral shaped blade.

Another preferred object of the present invention is solved by a method for batching fish into a cooling device. Preferably, the method comprises the step of transporting the fish on a feeding conveyor, registering one or more image of the fish by an imaging device as the fish are transported on the feeding conveyor past the imaging device and diverting fish off the feeding conveyor by a diverting means towards its destination in a processing line or cooling/freezing line. Preferably the method further comprises the step of processing said one or more image to determine at least one characteristic of the fish, determining the destination of each the fish based on the characteristics of said fish, and using line scanner imaging means to collect sequential images of each fish as the fish is conveyed on said feeding conveyor past the line scanner.

Accordingly, the set-up of the batching apparatus may involve a number of characteristics for batching items into one or more cooling tanks. The device according to the present invention is preferably designed batch single fish based on one or more image taken of a whole fish after it has been gutted and bleed.

In the present context the term "characteristics of an object" refers to any characteristics related to an object such size, weight, colour, image, shape, species of an animal, odour or scent.

The term "diverting means" is to be understood as means for diverting, ejecting, pushing or guiding objects from a moving conveyor belt.

In the present context the term batching refers to sorting items into groups or batches in a receptacle or defined area, such as a transport space between two upper rims of the spiral shaped blade in a cooling tank. The sorting is based on any criteria or characteristics, such as, but not limited to size, weight, colour, image, shape, and species of an animal, odour or scent.

In the present context the term "under-cooled state" refers to a whole fish or fish product brought to a temperature at or below 0° C. but generally without freezing the product, meaning that the water in the product has not fully crystallized.

In the present context the term "fish" or "whole fish" relates to a fish which is either freshly caught and unprocessed or pre-processed which can include one or more of cutting open, bleeding, gutting, washing, grading, beheading, removing the tail fin or other fin, and any combination thereof.

The method and the apparatus is preferably adapted to facilitate high speed batching of single whole fish after pre-processing and prior to cooling (e.g. under-cooling) the whole fish on a fishing ship or at a site near fish farm where farmed fish is being slaughtered. The fish is brought out of water to workstations, where the fish is gutted and bled. Preferably, the fish is then transported from the workstations as single fish objects to a transfer/rinsing/bleeding belt, which treats and transports each fish individually onto a feeding conveyor. Associated with the feeding conveyor is arranged an imaging device where at least one characteristic of every fish is obtained. Preferably, the fish is then ejected off the feeding conveyor to its destination based on characteristics obtained by the imaging device.

Preferably the batching apparatus of the present invention receives individual whole fish from an apparatus which facilitates bleeding of fish after gutting. Characteristic properties of every individual whole fish are determined and whole fish is batched into compartments in a cooler for stepwise cooling of the whole fish.

The imaging means or imaging device of the apparatus of the present invention can be selected from a number of suitable devices known to the skilled person.

The imaging device must be able to obtain images of the fish as the fish is transferred at a high speed past the imaging device. The imaging device is connected to computing means which forms part of the apparatus, which is suitably a computer with a processor and a memory configure to receive data from the imaging device and process the data to determine one or more characteristic of the fish. The imaging device can be a camera for obtaining a two-dimensional image of the fish or in preferred embodiments the imaging device is a line scanner for obtaining sequential two-dimensional images of the fish, wherein a plurality of such sequential images are processed for each fish to determine the desired one or more characteristic.

Preferably the imaging device is positioned above the feeding conveyor, at a location just after the fish are placed on the belt. The imaging device and the computer determine at least one characteristic of the fish and preferably two or more characteristics, such as size, weight, colour, species, etc. and determine based on the determined characteristic into which batching compartment the fish is to be ejected.

All embodiments listed below relate to both the apparatus and the method of the present invention.

In one preferred embodiment the apparatus of the invention is configured for one or more fish species selected from, but not limited to cod, haddock, pollock, ling, blue ling, whiting, wolfish (*Anarhichas lupus* also known as Atlantic catfish), herring and mackerel. Cod refers herein to the various species of the *Gadus* type such as but not limited to *Gadus morhua* (Atlantic cod), *Gadus marocephalus* (Pacific cod), *Gadus ogac* (Greenland cod), In one preferred embodiment the apparatus of the invention uses the imaging means and the computing means to obtain information to determine one or more of characteristics such as, but not limited to, species, size, shape, colour, visage or appearance, condition such as if the fish was already dead when it was gilled and/or gutted. By this feature the apparatus is able to determine the quality of the fish and sort out fish that died prior to being landed and pre-processed, such as due to harsh condition in the trawl bag (too high fish density, too fast tow speed, etc.), from fish that came on board alive. The apparatus preferably uses colour recognition comparison for this purpose, thus based on the colour and visual appearance if the fish compared to reference patterns, the apparatus is able to determine such quality parameters including but not limited to determining if the fish died prior to pre-processing.

In an embodiment of the present invention the determination of shape may include determination of size and/or shape of the head of the fish or the volume of the head. The determination of shape may further include determination of the ratio between the size or volume of the head and the rest of the fish. This may be advantageous for batching fish based on shape of head for fitting into beheading apparatus in further processing of the fish.

In one preferred embodiment the apparatus of the invention uses the determined characteristics information to further estimate towing conditions, such as the length of time of towing and the speed of towing the fishing net with which the fish was caught. This is done by collecting and determining quality parameters such as just described for a plurality of fish and a statistical analysis of fish from the catch is used to determine overall quality parameters of the catch, which can be related to towing conditions. The information can suitably and instantly be forwarded to a controller, such as the captain of the vessel, who can then judge if the towing conditions need to be changed to increase the quality of the next catch.

In useful embodiments of the apparatus, the feeding conveyor belt is of a suitable selected colour, and the imaging device is configured so as not to register the wavelength of said colour. The selected colour is selected to be suitably in contrast with common fish species to be processed, in certain embodiment a light blue colour is selected.

In one preferred embodiment of the apparatus the controller is a controller of the ship or a decision maker on shore.

In one specific embodiment of the apparatus of the invention, the apparatus further comprises one or more cooling tanks with a spiral shaped blade mounted on a rotation axis to convey the objects along the length of the tank, said spiral shaped blade forming transport spaces between two adjacent blades of the spiral shaped blade the apparatus also has one or more distribution conveyors receiving items from the feeding conveyor, said one or more distribution conveyors further comprising one or more diverting means for diverting the objects into the transport spaces of the spiral shaped blade in the cooling tank, each of the one or more distribution conveyors is positioned adjacent to one of the one or more cooling tanks. The computing means further determines the cooling tank and transport space which each the fish is released into based on the characteristics of said object. Also, the belt of the one or more distribution conveyors move forwards and backwards along part of the length of the one or more cooling tank to direct the objects into the transport space determined by the computing means.

In one specific embodiment of the the method comprises transporting fish on a feeding conveyor, registering one or more image of the fish by an imaging device as the fish are transported on the feeding conveyor past the imaging device, diverting fish off the feeding conveyor by a diverting means towards its destination and processing the one or more image to determine at least one characteristic of the fish. The method further comprises determining the destination of each the fish based on the characteristics of said fish, and using line scanner imaging means to collect sequential images of each fish as the fish is conveyed on said feeding conveyor past the line scanner. The method may further comprise the steps of diverting fish off the feeding conveyor by a diverting means into an apparatus for facilitate bleeding of the fish, releasing the fish from the apparatus for facilitate bleeding of the fish onto one of the one or more distribution conveyors, and diverting the fish from one of the one or more distribution conveyors into one or more cooling tanks with a spiral shaped blade mounted on a rotation axis to convey the fish along the length of the tank by one or more diverting means. In such embodiment the one or more distribution conveyors move forwards and backwards along part of the length of the one or more cooling tank to direct the fish into the spaces of the spiral shaped blade during rotation of the blade, and the computing means further determine into which space of the spiral shaped blade of each cooling tank the fish is released based on the characteristics of said fish.

In one preferred embodiment the batching apparatus is a part of a system onboard a fishing vessel for bringing whole fish to an undercooled state before further processing, either onboard the ship or in land.

In one preferred embodiment the batching apparatus is a part of a system at a slaughtering station for farmed fish, such as salmon onboard a fishing vessel or on a structure attached to the fish farm, for bringing whole fish to an undercooled state before further processing the fish.

In an embodiment of the present invention characteristics based on information from the imaging means and the computing means is used to estimate the effect of time and the speed of towing on the fishing.

As mentioned above, it is an advantage of the invention that the apparatus and methods offer a very high throughput and high speed analysis and batching, compatible with fast pre-processing times on board a trawler, to minimize handling time prior to cooling and storage. In some embodiments the apparatus receives and batches at least one fish per second, and more preferably at least two fish per second, and yet more preferably at least 4 fish per second, and more preferably at least 5 fish per seconds. For a reliable and successful quality analysis of the fish, such as but not limited to species detection and determining quality factors such as death prior to gutting, the imaging device takes a series of sequential images for each fish. In some embodiments a fast line scanner is applied which is configure to take an image for every 1-10 mm and preferably one image for every 1-5 mm, such as one image for every 1-2 mm.

In an embodiment of the present invention the feeding conveyor has a substantially V-shaped or U-shaped cross-section for supporting fish being conveyed, wherein the feeding conveyor conveys the fish past the imaging means. The feeding conveyor comprises two adjacent parallel conveyor belts that form an angle between them to create a V-shaped cross-section. The V-shaped conveyor, comprises two individual continuous conveyor belts, comprises two endless flank conveyors being arranged in a V-shape and running synchronously in an outfeed direction to feed the objects further in a processing line. A V-shaped conveyor immobilizes the fish for stable imaging during the transfer on the belt.

In an embodiment of the present invention the objects are conveyed in the same space of the spiral shaped blade through two or more sections of the cooling tank they are released into.

In an embodiment of the present invention each section of each cooling tank can comprise different cooling media.

In an embodiment of the present invention the temperature of the cooling media in each section varies to bring the objects to an undercooled state in a stepwise process.

In an embodiment of the present invention the time the object in each space of the spiral shaped blade spend in each section varies based on the characteristics of the objects.

In an embodiment of the present invention the objects to be batched are fish, such as cod, haddock, herring and mackerel.

In an embodiment of the present invention the time the object in each space of the spiral shaped blade spend in each section and the temperature and the type of cooling media varies based on the characteristics of the objects and is determined by the computing means.

In an embodiment of the present invention the imaging means is provided for determining size, shape or colour of the whole fish prior to transferring the fish to the cooling tank.

In an embodiment of the present invention individual characteristic properties of individual whole fish is determined and whole fish is batched into compartments in a cooler for stepwise cooling of the whole fish.

In an embodiment of the present invention a camera is positioned above the feeding conveyor, just after the fish are placed on the belt.

In an embodiment of the present invention the camera and the computer determine at least one characteristics of the fish, such as, but not limited to size, weight, colour and species and determine also into which batching space of a screw conveyor cooler the fish is to be ejected into.

In an embodiment of the present invention the spiral shaped blade in each section of each cooling tank forms a plurality of batching spaces to receive a batch of items with similar or the same characteristic properties.

In an embodiment of the present invention the camera and the computer controlling the batching apparatus determine the characteristics of individual fish and determine the batching space the fish is to be sorted into.

In an embodiment of the present invention the distribution conveyor is adapted to move forwards and backwards along the length of the first section of the cooling tank.

In an embodiment of the present invention the computer determines the position of the fish on the distribution conveyor and the exact position of the batching space and activates a diverting means when the fish on the belt is in a correct position with respect to the batching space. Preferably the fish is ejected onto the batching space by moving the row of diverting means relative to the position of the batching space and using the forward and the backwards movement of the belt to position the fish for ejection.

BRIEF DESCRIPTION OF THE DRAWINGS

The present invention will become more fully understood from the detailed description given hereinafter and the accompanying drawings which are given by way of illustration only, and thus, are not limitative of the present invention, and wherein.

DETAILED DESCRIPTION OF THE INVENTION

Figure 1:
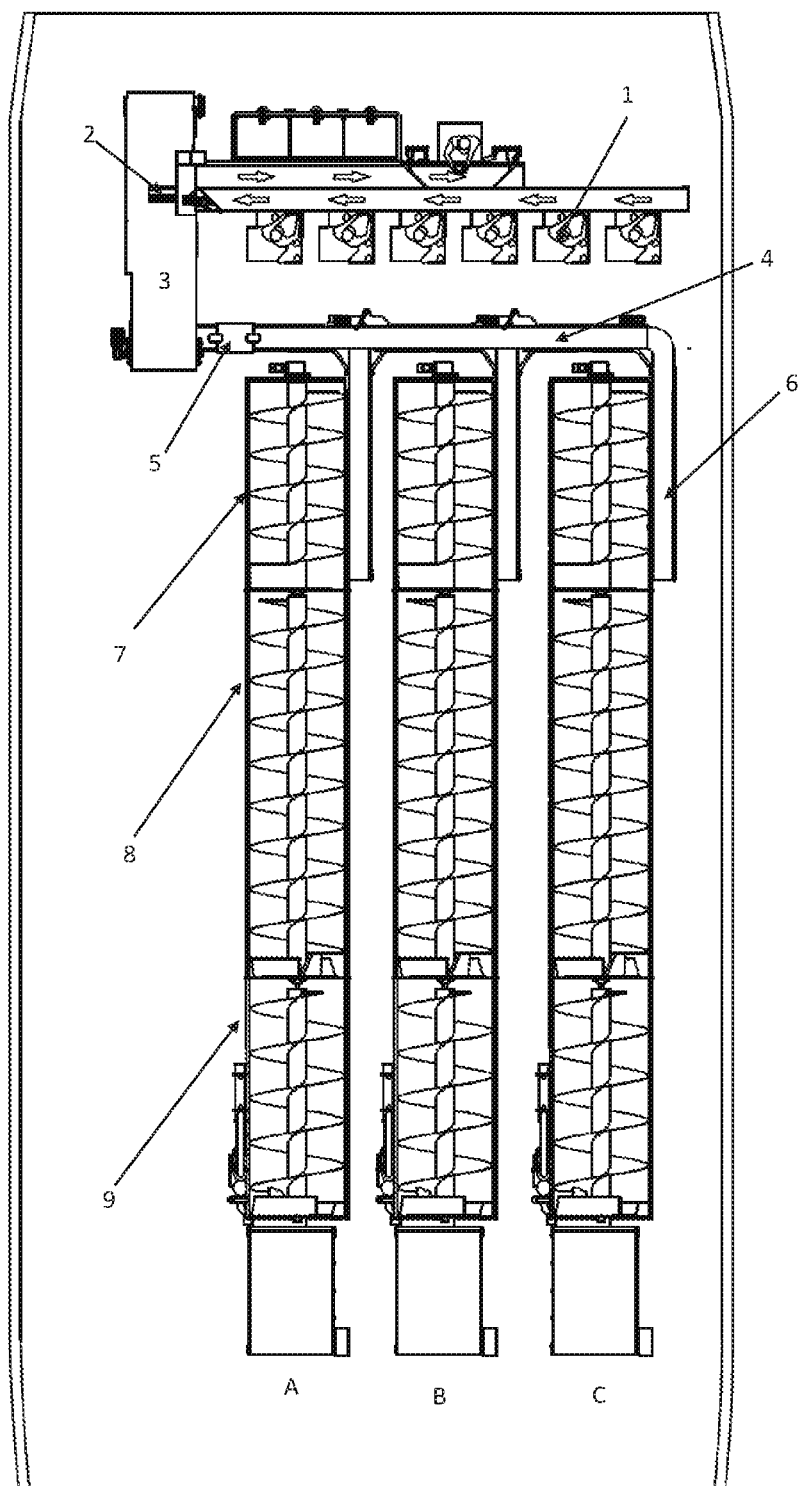
FIG. 1 is a top view of a processing line including the apparatus of the present invention.

FIG. 1 shows an arrangement of the invention to facilitate pre-processing and under-cooling of whole fish on a fishing ship. The fish is brought on deck in the aft end of the ship and brought to workstations 1 to gut and bleed the fish. The fish is then transported from the workstations on an in-feeding belt 2 to a transfer/rinsing belt 3 to facilitate the bleeding step. The transfer/rinsing belt 3 feeds the fish individually onto a feeding conveyor 4, where a series of images is obtained of every fish by a camera 5 which in a certain embodiment is a line scanner. The fish is then diverted to distribution conveyors 6 and from the distribution conveyors into a cooling tank 7, 8, 9 for bringing the fish to an undercooled state. The embodiment shown in this drawing has three lines of a batching and undercooling tanks, the first one A for small fish, the second B for intermediate size fish and the third line C for large fish. Size determination is made by the camera 5 and the fish are directed into an appropriate lane based on this size determination. The fish is transported through the tank by the screw blade, which functions as a screw conveyor and slowly moves the fish from one end of the tank to another. The tank is divided into three compartments 7, 8 and 9 for performing a three step cooling of the fish with the end results of storing or processing fish in an undercooled state. The duration of transfer in each compartment can be based on the size of the fish or species or if the fish is destined for further processing or storing. Each compartment in the cooling tank has a separate screw blade and a heat exchanger (not shown) to set the temperature in each compartment. The first compartment 7 is short and normally has a concentration controlled saline solution or slurry ice with a high salt concentration at a low temperature to bring the temperature of the fish down quickly. The second compartment 8 is longer and has a concentration controlled saline solution or slurry ice with a low salt concentration at a higher temperature (but below 0° C.) to allow the fish to achieve a stable homogenous/even temperature. The third compartment 9 is short like the first one and has a concentration controlled saline solution or slurry ice with a high salt concentration at a low temperature to bring the temperature of the fish down quickly again.

Figure 2:
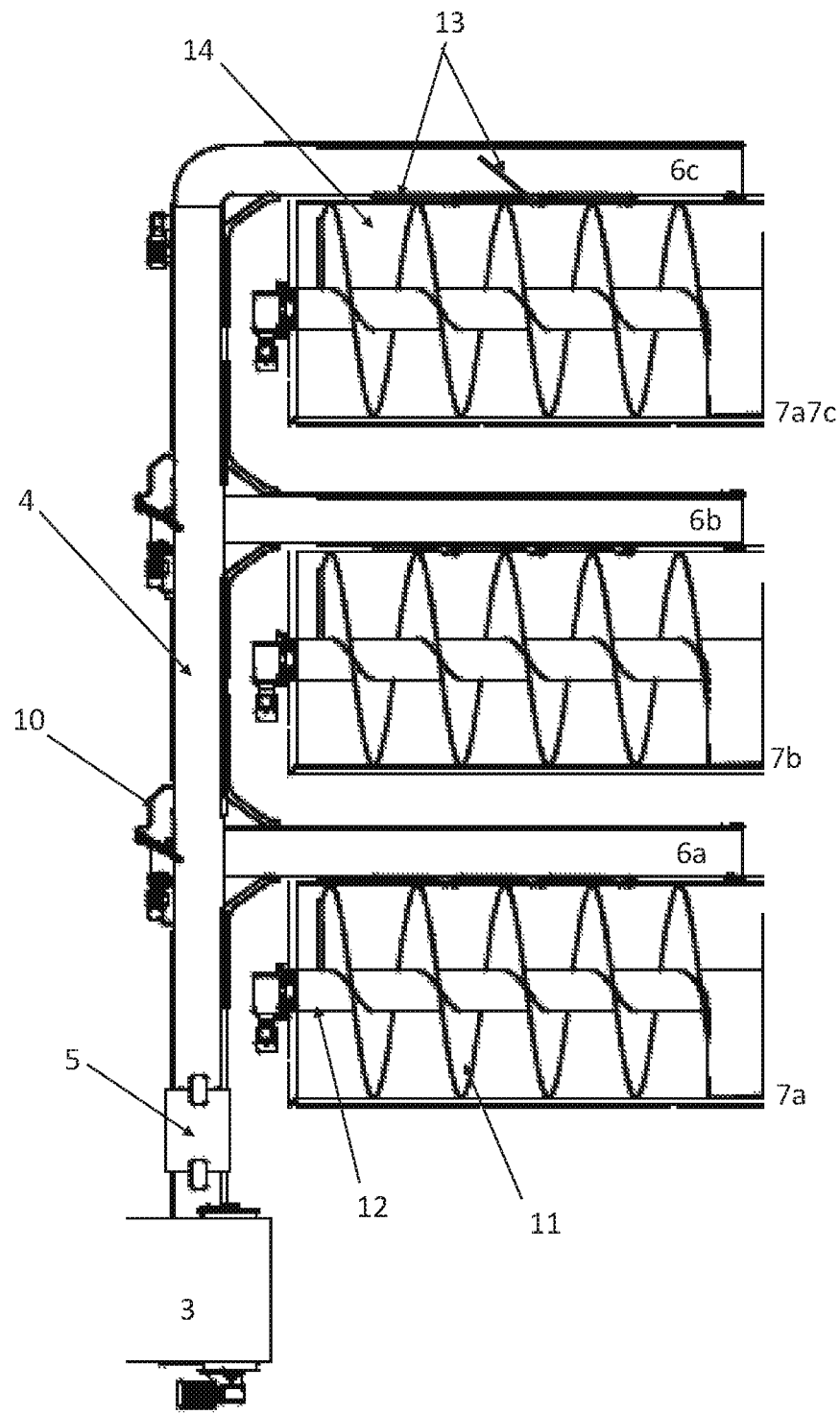
FIG. 2 is a top view of the batching mechanism of the apparatus of the present invention.

FIG. 2 shows a top view of the batching apparatus of the present invention. The transfer/rinsing belt 3 delivers each fish individually onto a feeding conveyor 4. In the embodiment shown in FIG. 2 a camera or line scanner 5 is positioned at the beginning of the feeding conveyor 4 above the conveyor to obtain one or more image of every fish. The camera and the computer determine at least one characteristics of the fish, such as size, weight, colour, species, etc. The feeding conveyor 2 has several diverting means 10 for diverting objects off the feeding conveyor onto distribution conveyors 6a, 6b and 6c. In FIG. 2, the first section of 3 cooling tanks 7a-c) is shown, where each cooling tank has a spiral shaped blade 11 mounted on a rotation axis 12 to convey the objects along the length of the tank.

The distribution conveyors 6a-c are positioned adjacent to the first section of cooling tanks 7a-c for receiving items from the feeding conveyor 4. The distribution conveyors 6 a-c further have diverting means 13 for diverting the fish into the spaces 14 of the spiral shaped blade in a cooling tank.

Figure 3:
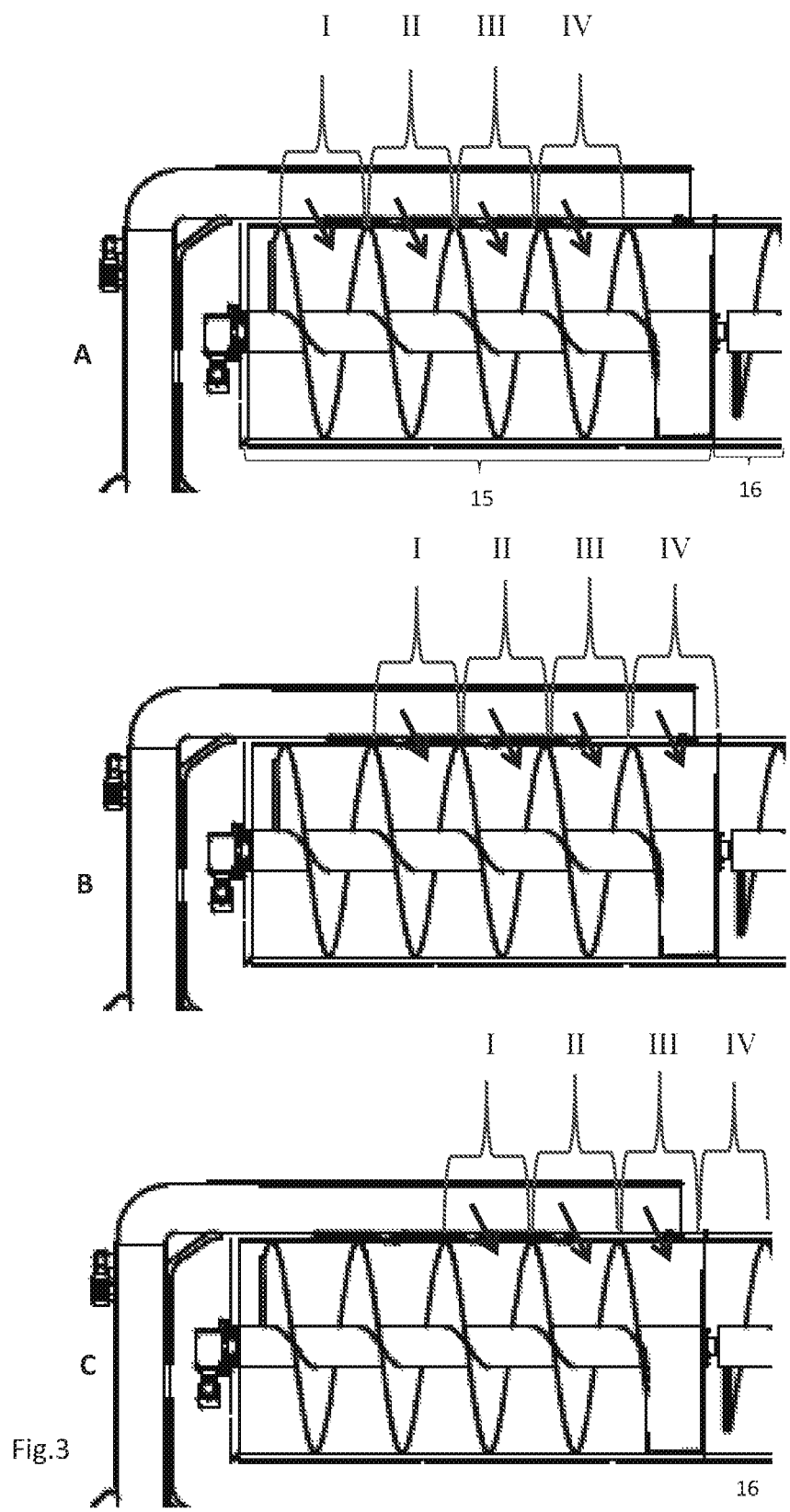
FIG. 3 is a top view of the batching mechanism of the present invention showing the movement and arrangement of the batching spaces.

FIG. 3 shows the batching function of the apparatus of the present invention. The spiral shaped blade in each section of each of the tanks forms a plurality of spaces (I, II, III and IV), where each space moves forward as the spiral shaped blade is rotated around the axis. When he image means 5 and the computing means have determined the characteristics of a fish and determined into which tank 7 is should be batched to, it is transferred by the feeding conveyor 4 delivers the fish to distribution conveyor 6 for the tank 7 into which the fish is to be batched to. The belt of the distribution conveyor 6 can move forwards and backwards along the length of the first section of the cooling tank. This is to enable direction of the objects into the spaces of the spiral shaped blade during rotation of the blade. This means that the diverting means of the distribution conveyor (not shown in the drawing) follow the gap position each time. The figure shows 4 defined spaces for different type of objects, which may be based on weight only or weight and species, such as herring and mackerel. In FIG. 3A, the spaces I-IV are all in the first section 15 of the tank. As the spaces start to fill up and the first part of cooling the fish down is underway, the spiral shaped blade is rotated and now space 4 is at the end of the first space 15 of the tank. The end of the blade is designed such that it shovels the fish in the last space (IV) over to the next section 16 of the tank (FIG. 3C). The fish in that space (IV) will start the next step of bringing the fish to an undercooled state, but remain in the same batch.

The invention claimed is:
1. An apparatus for imaging and sorting fish, the apparatus comprising:
  imaging means configured to obtain images of each fish being transferred past the imaging means,
  a feeding conveyor, said feeding conveyor comprising diverting means downstream of the imaging means for diverting fish off the feeding conveyor,
  computing means, and
  a cooler,
  wherein the computing means is configured to process said images to determine at least one characteristic of the fish, the at least one characteristic of the fish is used to batch fish into compartments in the cooler for stepwise cooling of the fish,
  wherein the computing means is configured to send instructions to the diverting means, and
  wherein the imaging means comprise a line scanner that is configured to collect sequential images of each fish as the fish is conveyed on said feeding conveyor past the line scanner.

2. The apparatus according to claim 1, configured to sort fish selected from cod, haddock, ling, blue ling, pollock, wolfish, herring and mackerel.

3. The apparatus according to claim 1, wherein the imaging means and the computing means are configured to determine characteristics comprising size, shape, species, and colour of fish.

4. The apparatus according to claim 3, wherein the computing means are further configured to determine if the fish was dead when it was gilled and/or gutted, based on determined characteristics such as shape, colour, visage or appearance of the fish.

5. The apparatus according to claim 1, located on board a fishing vessel.

6. The apparatus according to claim 1, wherein the line scanner is configured to obtain sequential images of the fish conveyed past the line scanner every 1-10 mm, 1-5 mm or 1-2 mm.

7. The apparatus of claim 6, wherein the line scanner is configured to obtain sequential images of up to 30-300 fish/min.

8. The apparatus of claim 1, wherein the feeding conveyor has a substantially V-shaped or U-shaped cross-section for supporting fish being conveyed, wherein the feeding conveyor conveys the fish past the imaging means.

9. The apparatus of claim 1, wherein the feeding conveyor comprises two adjacent parallel conveyor belts that form an angle between them to create a V-shaped cross-section.

10. The apparatus of claim 1, wherein the computing means is configured to send information on the characteristic of the fish to a controller.

11. The apparatus according to claim 10, wherein the controller is a controller of the ship.

12. The apparatus according to claim 10, wherein the controller is a decision maker on shore.

13. The apparatus of claim 1, wherein the feeding conveyor belt is of a suitable selected colour, and where the imaging device is configured so as not to register the wavelength of said colour.

14. The apparatus of claim 1, wherein the apparatus further comprises a one or more distribution conveyors for receiving fish from the feeding conveyor for receiving objects ejected of the feeding conveyor.

15. The apparatus according to claim 14, wherein the apparatus further comprises:
one or more cooling tanks with a spiral shaped blade mounted on a rotation axis to convey the objects along the length of the tank, said spiral shaped blade forming transport spaces between two adjacent blades of the spiral shaped blade,
one or more distribution conveyors receiving items from the feeding conveyor, said one or more distribution conveyors further comprising one or more diverting means for diverting the objects into the transport spaces of the spiral shaped blade in the cooling tank, each of the one or more distribution conveyors is positioned adjacent to one of the one or more cooling tanks, and
wherein the computing means further determines the cooling tank and transport space which each the fish is released into based on the characteristics of said object, and
wherein the belt of the one or more distribution conveyors move forwards and backwards along part of the length of the one or more cooling tank to direct the objects into the transport space determined by the computing means.

16. A method for imaging and sorting fish, the method comprising:
transporting fish on a feeding conveyor,
registering one or more image of the fish by an imaging device as the fish are transported on the feeding conveyor past the imaging device,
diverting fish off the feeding conveyor by a diverting means towards its destination,
processing said one or more image to determine at least one characteristic of the fish,
determining a destination of each fish based on the characteristics of said fish, wherein the destination is a compartment of a cooler, and
wherein the imaging device comprises a line scanner that is configured to collect sequential images of each fish as the fish is conveyed on said feeding conveyor past the line scanner.

17. The method according to claim 16, wherein characteristics based on information from the imaging means and the computing means is used to estimate the effect of time and the speed of towing on the fishing.

18. The method according to claim 17, wherein the method further comprises
diverting fish off the feeding conveyor by a diverting means onto distribution conveyors,
receiving fish from the feeding conveyor onto one of the one or more distribution conveyors
diverting the fish from one of the one or more distribution conveyors into one or more cooling tanks with a spiral shaped blade mounted on a rotation axis to convey the fish along the length of the tank by one or more diverting means,
wherein the one or more distribution conveyors move forwards and backwards along part of the length of the one or more cooling tank to direct the fish into the spaces of the spiral shaped blade during rotation of the blade, and
wherein the computing means further determine into which space of the spiral shaped blade of each cooling tank the fish is released based on the characteristics of said fish.

* * * * *